United States Patent
Shah et al.

(10) Patent No.: US 11,475,723 B2
(45) Date of Patent: Oct. 18, 2022

(54) DETERMINING A FAULT IN AN ELECTRONIC CONTROLLER

(71) Applicant: Robert Bosch GmbH, Stuttgart (DE)

(72) Inventors: Ankit R. Shah, Canton, MI (US); Anthony Judge, West Bloomfield, MI (US); Sivaraja Velusamy, Northville, MI (US); Anthony J. Farrell, Clinton, MI (US); Evangelin C. Vijitha, Farmington Hills, MI (US); Ragavi Ramamurthy, Coimbatore (IN)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 16/227,077

(22) Filed: Dec. 20, 2018

(65) Prior Publication Data
US 2019/0206154 A1    Jul. 4, 2019

Related U.S. Application Data

(60) Provisional application No. 62/611,761, filed on Dec. 29, 2017.

(51) Int. Cl.
| | | |
|---|---|---|
| *G07C 5/08* | (2006.01) | |
| *G06F 21/60* | (2013.01) | |
| *G07C 5/00* | (2006.01) | |
| *G01R 31/00* | (2006.01) | |
| *G06F 21/57* | (2013.01) | |

(52) U.S. Cl.
CPC ............ *G07C 5/085* (2013.01); *G01R 31/007* (2013.01); *G06F 21/57* (2013.01); *G06F 21/602* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 8,095,264 B2 | 1/2012 | Tanigawa et al. | |
| 8,452,465 B1* | 5/2013 | Sinha | G06F 11/143 701/2 |
| 9,043,078 B2* | 5/2015 | Johnson | G06F 11/3466 701/32.7 |
| 9,047,718 B2* | 6/2015 | Kakinuma | G07C 5/0808 |
| 9,201,844 B2 | 12/2015 | Guenkova-Luy et al. | |
| 9,772,839 B2* | 9/2017 | Hong | H04M 1/72525 |
| 9,912,531 B2* | 3/2018 | Neff | H04L 41/0803 |

(Continued)

OTHER PUBLICATIONS www.obdii.com/background.html (Year: 1996).*

*Primary Examiner* — Jelani A Smith
(74) *Attorney, Agent, or Firm* — Michael Best & Friedrich LLP

(57) ABSTRACT

Systems and methods for determining a fault in an electronic controller. The system includes a first electronic controller, a second electronic controller, and a remote electronic controller. The second electronic controller executes a diagnostic service routine configured to access a restricted section of a memory associated with the first electronic controller, receives a failure code from the restricted section of the memory associated with the first electronic controller, generates a logging file including the failure code, and sends the logging file to the remote electronic controller. The remote electronic controller determines a fault in the first electronic controller based upon the logging file.

15 Claims, 4 Drawing Sheets

(56) References Cited

U.S. PATENT DOCUMENTS

| | | | |
|---|---|---|---|
| 2004/0025078 A1* | 2/2004 | Nagano | G05B 19/058 714/11 |
| 2007/0213895 A1 | 9/2007 | Nakayama | |
| 2008/0010506 A1* | 1/2008 | Tabei | G06F 11/0784 714/6.12 |
| 2008/0033609 A1 | 2/2008 | Razavi | |
| 2009/0299566 A1* | 12/2009 | Tanigawa | G07C 5/008 701/31.4 |
| 2010/0023665 A1* | 1/2010 | Horikawa | G06F 11/0724 710/115 |
| 2010/0138693 A1* | 6/2010 | Ohkawa | G06F 11/1695 714/25 |
| 2010/0229038 A1* | 9/2010 | Mayer | H04L 12/40189 714/27 |
| 2010/0256860 A1* | 10/2010 | Yamada | G01M 17/00 701/29.6 |
| 2014/0005880 A1* | 1/2014 | Guenkova-Luy | H04L 67/12 701/31.4 |
| 2014/0195108 A1* | 7/2014 | Schumacher | G06F 17/00 701/36 |
| 2016/0300402 A1* | 10/2016 | Nassar | G07C 5/085 |
| 2017/0262011 A1* | 9/2017 | Kwon | G06F 1/06 |
| 2017/0278320 A1* | 9/2017 | Isozaki | H04L 9/088 |
| 2017/0301154 A1* | 10/2017 | Rozint | G07C 5/085 |
| 2018/0154906 A1* | 6/2018 | Dudar | B60R 21/0136 |
| 2018/0174373 A1* | 6/2018 | Hansen | B60R 16/0232 |
| 2019/0180526 A1* | 6/2019 | Mehdizade | G07C 5/085 |
| 2019/0190899 A1* | 6/2019 | Wilmer | H04L 63/061 |

* cited by examiner

… … …

DETERMINING A FAULT IN AN ELECTRONIC CONTROLLER

CROSS-REFERENCE TO RELATED APPLICATIONS

This application claims priority to U.S. Provisional Patent Application No. 62/611,761, filed Dec. 29, 2017, the entire contents of which is incorporated by reference in its entirety.

FIELD

Embodiments relate to methods and systems for determining a fault in an electronic controller.

BACKGROUND

Computers and electronic controllers control many systems including, for example, vehicle control systems. When a breakdown or fault occurs in these systems, the electronic controller is often replaced.

SUMMARY

When a technician services a system and an electronic controller controlling that system, the technician may mistakenly replace the electronic controller even if a fault has not actually occurred in the electronic controller. Thus, a method is needed for determining if a fault has truly occurred in the electronic controller.

Embodiments of this invention are therefore directed to determining a fault in an electronic controller.

One embodiment provides a system for determining a fault in an electronic controller. The system includes a first electronic controller, a second electronic controller, and a remote electronic controller. The second electronic controller is configured to execute a diagnostic service routine configured to access a restricted section of a memory associated with the first electronic controller, receive a failure code from the restricted section of the memory associated with the first electronic controller, generate a logging file including the failure code, and send the logging file to the remote electronic controller. The remote electronic controller is configured to determine a fault in the first electronic controller based upon the logging file.

Another embodiment provides a method for determining a fault in a first electronic controller. The method includes executing, with a second electronic controller, a diagnostic service routine configured to access a restricted section of a memory associated with on the first electronic controller; receiving, with the second electronic controller, a failure code from the restricted section of the memory associated with the first electronic controller in response to executing the diagnostic service routine; generating, with the second electronic controller, a logging file, the logging file including the failure code; sending, with the second electronic controller, the logging file to a remote electronic controller; and determining, with the remote electronic controller, a fault in the first electronic controller based on the logging file.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
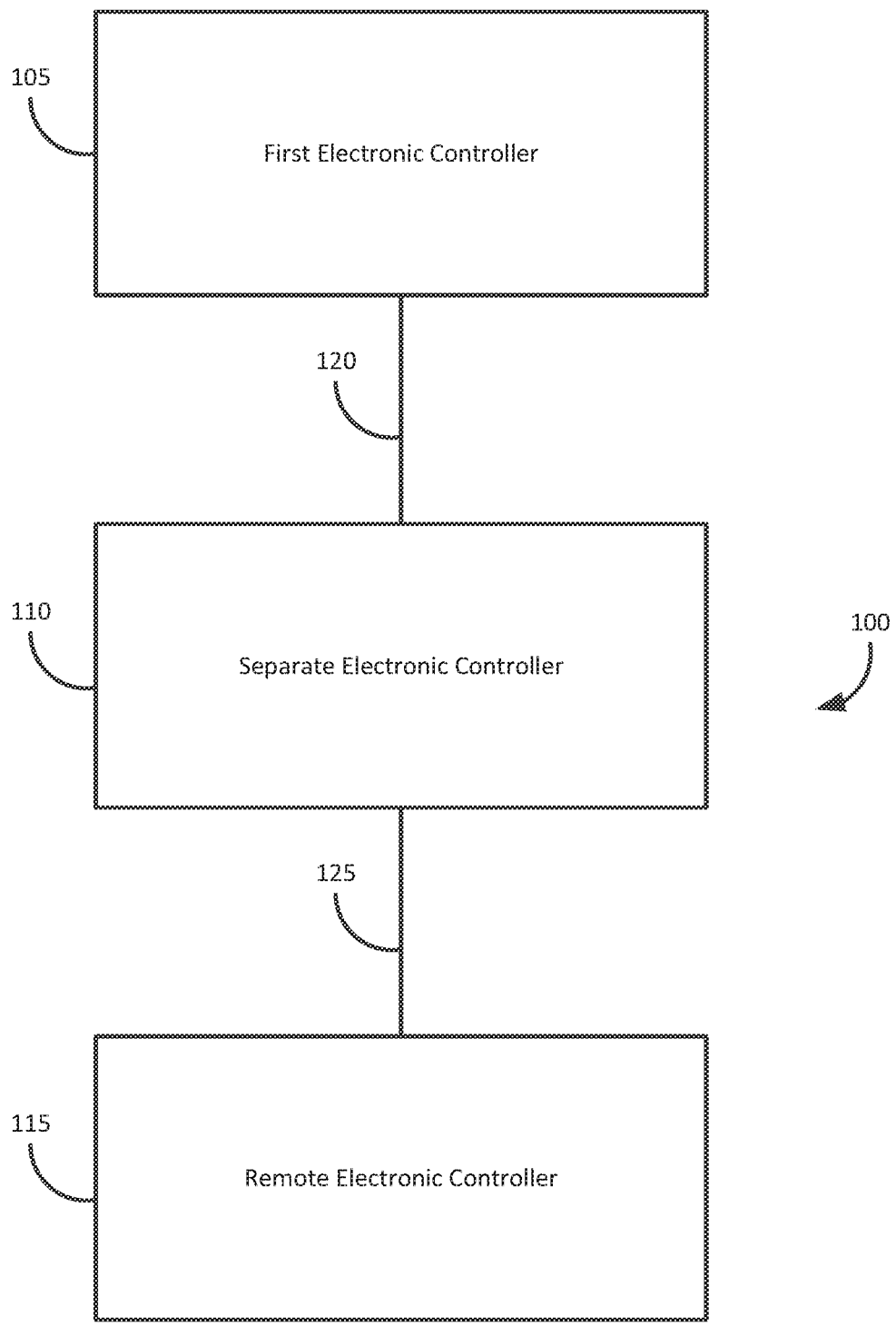
FIG. 1 illustrates a system for determining a fault in an electronic controller according to one embodiment.

FIG. 1 illustrates a system 100 for determining a fault in a first electronic controller 105 according to one embodiment. The system includes the first electronic controller 105, a second electronic controller 110, and a remote electronic controller 115.

Figure 2:
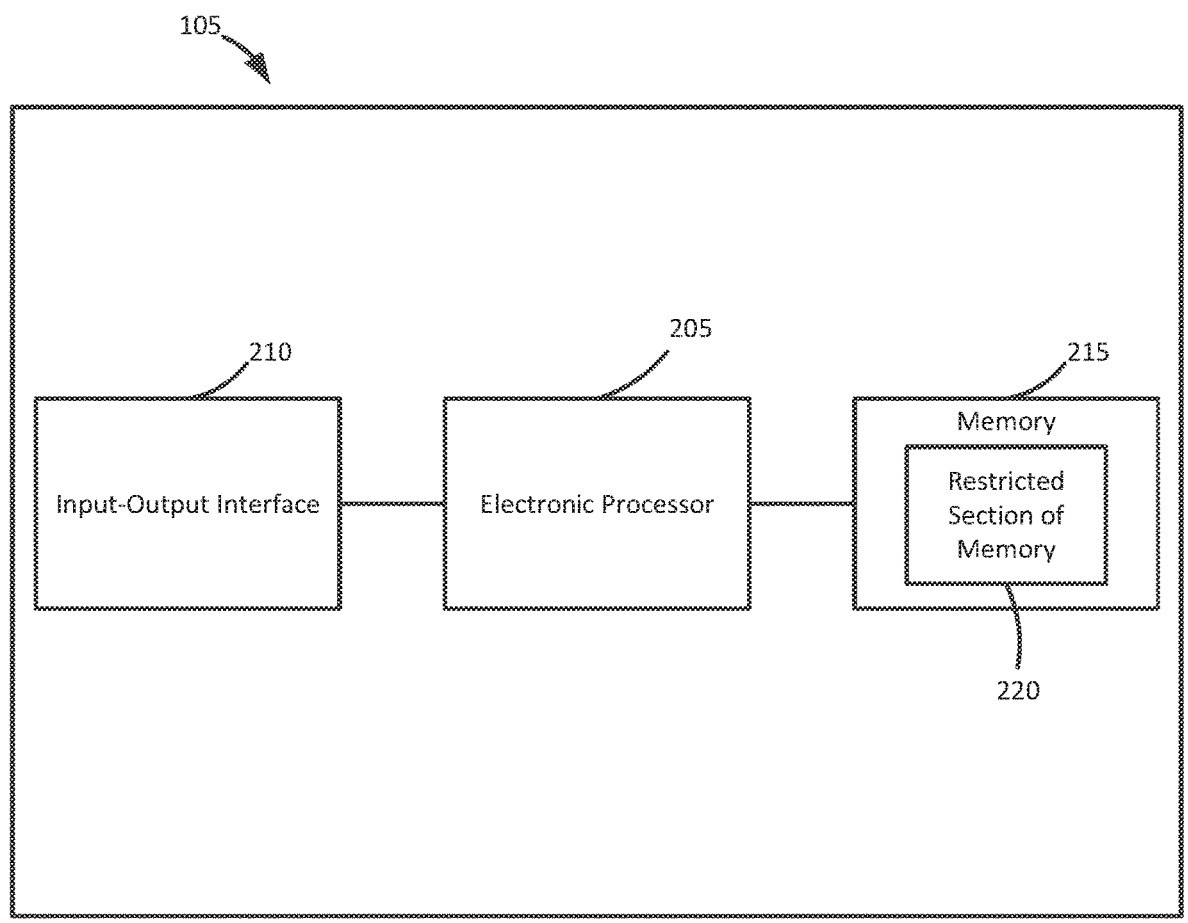
FIG. 2 illustrates a first electronic controller according to one embodiment.

An example of the first electronic controller 105 is illustrated in FIG. 2. In some embodiments, the first electronic controller 105 is an electronic controller for use in a vehicle. The first electronic controller 105 includes a plurality of electrical and electronic components that provide power, operation control, and protection to the components and modules within the first electronic controller 105. In the example illustrated, the first electronic controller 105 includes a first electronic processor 205 (such as a programmable electronic microprocessor, microcontroller, or similar device), a first input-output interface 210, and a first memory 215 (for example, a non-transitory, computer-readable medium). The first electronic processor 205 is communicatively connected to the first input-output interface 210 and the first memory 215. The first memory 215 may further included a restricted section of memory 220. The restricted section of memory 220 may be protected by a password, a private key, and the like. The restricted section of memory 220 may be configured, in some embodiments, to store data that should be accessible only to a manufacturer of the first electronic controller 105 and not to an operator of the first electronic controller 105 (e.g., a technician).

The first electronic controller 105 is communicatively coupled to the second electronic controller 110 by a first coupling 120. In some embodiments, the first coupling 120 is a physical (wired) coupling between the first electronic controller 105 and the second electronic controller 110. In other embodiments, the first coupling 120 is a wireless communication coupling between the first electronic controller 105 and the second electronic controller 110.

Figure 3:
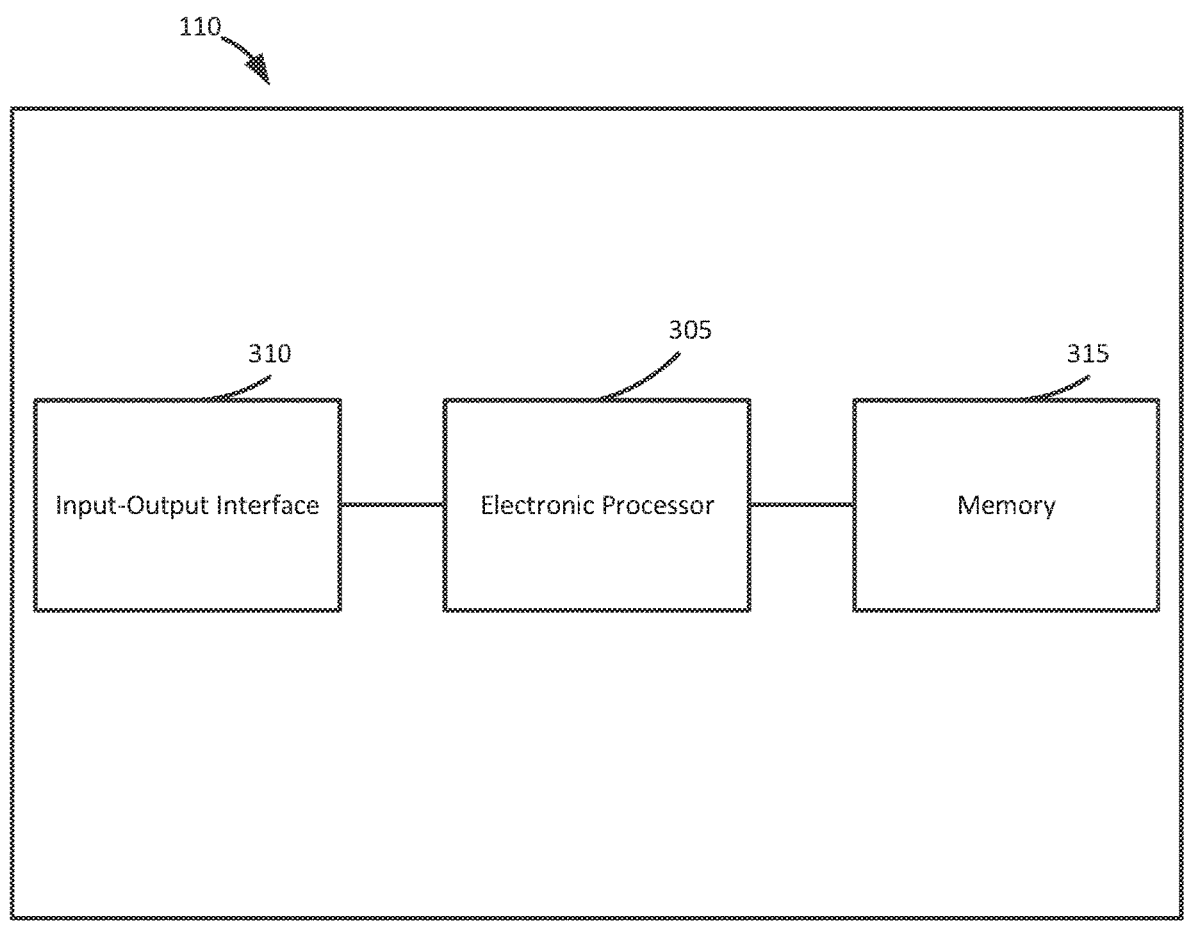
FIG. 3 illustrates a second electronic controller according to one embodiment.

An example of the second electronic controller 110 is illustrated in FIG. 3. In some embodiments, the second electronic controller 110 is similar to the first electronic controller 1105 and includes similar components (such as a second electronic processor 305, a second input-output interface 310, and a second memory 315) that may function in a similar manner to the components of the first electronic controller 105. However, the second memory 315 of the second electronic controller 110 does not require a restricted section of memory. In some embodiments, the second electronic controller 110 is configured to run a diagnostic service routine on the first electronic controller 105 (as described below). The second electronic controller 110 is, in some embodiments, an electronic controller used by a technician to diagnose faults in an electronic controller (such as the first electronic controller 105) in a vehicle.

The second electronic controller 110 is communicatively coupled to the remote electronic controller 115 by a second coupling 125. In some embodiments, the second coupling 125 is a physical (wired) coupling between the second electronic controller 110 and the remote electronic controller 115. In other embodiments, the second coupling 125 is a wireless communication coupling between the second electronic controller 110 and the remote electronic controller 115.

The remote electronic controller 115 is, in some embodiments, similar to the second electronic controller 110. The remote electronic controller 115 may be an electronic controller in a computing system at an original equipment manufacturer (OEM) facility, a remote diagnostic facility, and the like.

Figure 4:
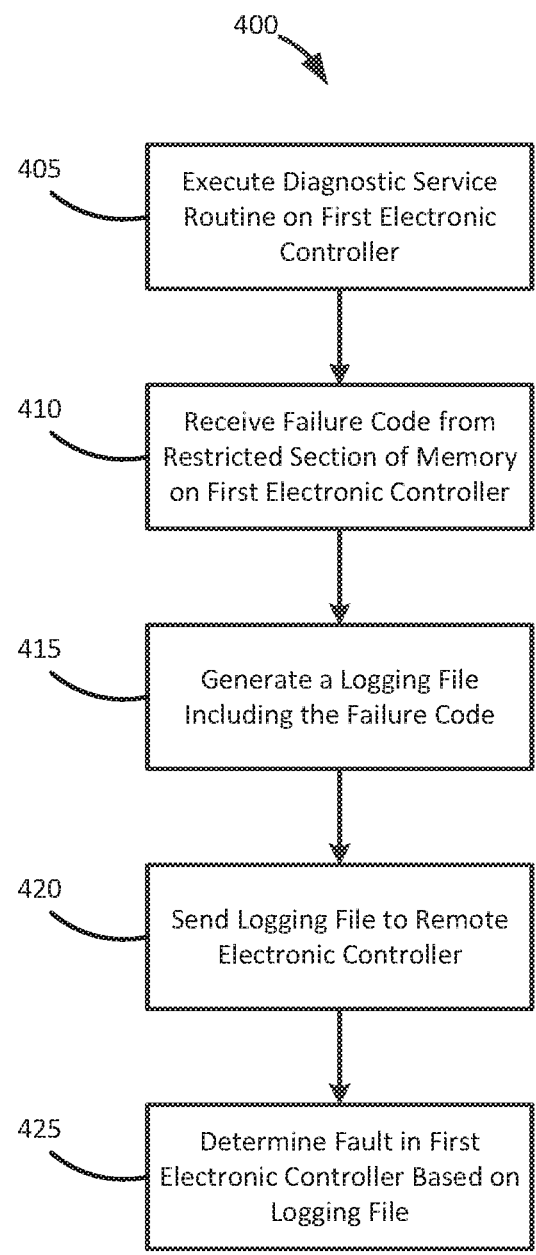
FIG. 4 illustrates a method for determining a fault in an electronic controller according to one embodiment.

FIG. 4 illustrates an example method 400 for determining a fault in the first electronic controller 105 according to one embodiment. The method 400 includes executing, with the second electronic processor 110, a diagnostic service routine on the first electronic controller (at block 405). The second electronic controller 110, through the first coupling 120, accesses the first electronic controller 105 and runs the diagnostic service routine on the first electronic controller 105.

The diagnostic service routine may be a software routine that is executed by the second electronic controller 110 on the first electronic controller 105. The diagnostic service routine may be created and provided by the OEM of the first electronic controller 105 to a user of the second electronic controller 110, the user being, for example, a dealership employee where service on a vehicle containing the first electronic controller 105 is being performed. The diagnostic service routine is configured to access the first memory 215 and, among other things, retrieve failure codes associated with different faults in the first memory 215 (which are stored during the operation of the first electronic controller 105). The diagnostic service routine, when provided by the OEM of the first electronic controller 105, may be further configured to access the restricted section of memory 220 in the first memory 215. For example, the diagnostic service routine, when provided by the OEM, may include the OEM private key or a password to access the restricted section of memory 220.

In response to the diagnostic service routine being executed by the second electronic controller 110 on the first electronic controller 105, the second electronic controller 110 receives the failure codes saved in the first memory 215 and in the restricted section of memory 220 (at block 410). The failure codes are received via the first coupling 120.

The failure codes are indicative of different faults that have occurred in the first electronic controller 105. For example, a failure code may indicate an attempt to access empty memory, a failure of a software routine, and the like. The failure code may be a numerical code (e.g., "111"), a text code, and the like. In some embodiments, the failure code also includes other failure information, such as date and time, vehicle conditions, and the like.

The second electronic controller 110 generates a logging file (at block 415). The logging file includes any failure codes received at block 410. The logging file may further include ticket information generated by the second electronic controller 110. The ticket information may include a serial number of the first electronic controller 105, a vehicle identification number, a software version number, a part number of the first electronic controller 105, vehicle line information, dealership information, and the like. The ticket information may also include any other product data management (PDM) information concerning the first electronic controller 105. In some embodiments, the ticket information is obtained when the diagnostic service routine is run on the first electronic controller 105.

The second electronic controller 110 then sends the logging file to the remote electronic controller 115 via the second coupling 125 (at block 420).

The remote electronic controller 115 determines, based upon the received logging file, a fault that has occurred in the first electronic controller 105 (at block 425). For example, the remote electronic controller 115 receives the logging file, extracts a failure code and associated failure information, extracts ticket information, and then determines a fault in the first electronic controller 105 based upon the extracted information. In some embodiments, only the failure code is used to determine the fault in the first electronic controller 105.

The remote electronic controller 115 may be further configured to alert a user of the remote electronic controller 115 or the second electronic controller 110 of the determined fault in the first electronic controller 105. For example, the remote electronic controller 115 may send a notification to the second electronic controller 110 to display on a display screen to a technician.

The remote electronic controller 115 may further display the determined fault of the first electronic controller 105 to an operator of the remote electronic controller 115 via a display screen. For example, in some embodiments, the remote electronic controller 115 is owned by the OEM of the first electronic controller 105, and the determined fault of the first electronic controller 105 is displayed to a software engineer or a quality control engineer to interpret the determined fault and determine a cause of the fault.

In some embodiments, the second electronic controller 110 is configured to initiate a virtual meeting with the operator of the remote electronic controller 115 and one or more other parties. For example, based upon the determined fault, the second electronic controller 115 initiates the virtual meeting using a virtual meeting service (for example, a video meeting service, a chat meeting service, a telephone meeting service, or the like) with the operator of the remote electronic controller 115 (such as an engineer from the OEM of the first electronic controller 105), an engineering team associated with a manufacturer of a vehicle containing the first electronic controller 105, one or more technicians at a dealership where the second electronic controller 110 is located, and others involved in the manufacture of a vehicle containing the first electronic controller 105, such as an engineering team of a third-party aftermarket part and the like.

Various features, advantages, and embodiments are set forth in the following claims.

What is claimed is:

1. A method (400) for determining a fault in a first electronic controller (105), the method (400) comprising:
    executing, with a second electronic controller (110), a diagnostic service routine configured to access a restricted section of a memory (220) associated with the first electronic controller (105),
    receiving, with the second electronic controller (110), a failure code from the restricted section of the memory (220) associated with the first electronic controller (105) in response to executing the diagnostic service routine,
    generating, with the second electronic controller (110), a logging file, the logging file including the failure code,
    sending, with the second electronic controller (110), the logging file to a remote electronic controller (115), and
    determining, with the remote electronic controller (115), a fault in the first electronic controller (105) based on the logging file.

2. The method (400) of claim 1, wherein the diagnostic service routine is provided to a user of the second electronic controller (110) by an original equipment manufacturer of the first electronic controller (105).

3. The method (400) of claim 1, wherein the diagnostic service routine accesses the restricted section of memory (220) by using a private key provided by an original equipment manufacturer of the first electronic controller (105).

4. The method (400) of claim 1, wherein the diagnostic service routine accesses the restricted section of memory (220) by using a password provided by an original equipment manufacturer of the first electronic controller (105).

5. The method (400) of claim 1, wherein the failure code indicates a fault that has occurred in the first electronic controller (105).

6. The method (400) of claim 5, wherein the failure code indicates at least one selected from the group consisting of an attempt to access empty memory and a failure of a software routine.

7. The method (400) of claim 5, wherein the failure code includes other failure information.

8. The method (400) of claim 1, wherein the logging file includes ticket information generated by the second electronic controller (110) when the diagnostic service routine is executed on the first electronic controller (105).

9. The method (400) of claim 8, wherein the ticket information includes at least one selected from the group consisting of a serial number of the first electronic controller (105), a vehicle identification number, a software version number, a part number of the first electronic controller (105), vehicle line information, dealership information, and product data management information about the first electronic controller (105).

10. The method (400) of claim 1, wherein the remote electronic controller (115) is further configured to generate a notification for a user of at least one of the second electronic controller (110) and the remote electronic controller (115) based upon the determined fault.

11. A system (100) for determining a fault in a first electronic controller (105), the system (100) comprising:
    the first electronic controller (105);
    a second electronic controller (110) configured to
        execute a diagnostic service routine configured to access a restricted section of a memory (220) associated with the first electronic controller (105), and
        receive a failure code from the restricted section of the memory (220) associated with the first electronic controller (105) in response to executing the diagnostic service routine,
        generate a logging file, the logging file including the failure code, and
        send, with the second electronic controller (110), the logging file to a remote electronic controller (115); and
    the remote electronic controller (115) configured to determine a fault in the first electronic controller (105) based on the logging file.

12. The system (100) of claim 11, wherein the diagnostic service routine is provided to a user of the second electronic controller (110) by an original equipment manufacturer of the first electronic controller (105).

13. The system (100) of claim 11, wherein the diagnostic service routine accesses the restricted section of memory (220) by using a private key provided by an original equipment manufacturer of the first electronic controller (105).

14. The system (100) of claim 11, wherein the diagnostic service routine accesses the restricted section of memory (220) by using a password provided by an original equipment manufacturer of the first electronic controller (105).

15. The system (100) of claim 11, wherein the logging file includes ticket information generated by the second electronic controller (110) when the diagnostic service routine is executed on the first electronic controller (105).

* * * * *